United States Patent Office 2,892,747
Patented June 30, 1959

2,892,747

NEW LINEAR COPOLYESTERS, PRODUCTS CONTAINING SAME AND PROCESS THEREFOR

John Irwin Dye, Cornwall-on-Hudson, N.Y., assignor to E. I. du Pont de Nemours and Company, Wilmington, Del., a corporation of Delaware No Drawing. Application December 15, 1955
Serial No. 553,394

12 Claims. (Cl. 154—43)

This invention relates to new polymeric compositions of matter, the method of their preparation, more particularly to laminates wherein at least two plies are adhered together with the polymer composition as an adhesive, and still more particularly to such laminates which involve at least one lamina of polyethylene terephthalate.

It is well-known that highly polymerized linear esters of terephthalic acid and glycols of the series $$HO(CH_2)_nOH$$

where $n$ is a whole number in the range of 2 to 10, are substantially inert and can be spun into filaments and thereafter woven into fabric having many desirable properties. These polymers can also be prepared as unsupported films by conventional methods such as casting from solution, melt casting and hot roll calendering. U.S. Patent 2,465,319 describes a process for the preparation of these terephthalate ester polymers.

While these polymeric fabrics and upsupported films are useful per se, still wider utility is anticipated for the polymeric fabric or film laminated to a second ply or a plurality of plies which may be of like or unlike characteristics or chemical composition. Hence, it is desirable to laminate film or fabric prepared from the polyester described in U.S. Patent 2,465,319 in a wide variety of constructions, such as, film to film, film to fabric, fabric to fabric, and film or fabric to chemically dissimilar surfaces. Representative chemically dissimilar surfaces include metals, glass, wood, particularly plywood, paper, polyacrylonitrile, polyvinylidene chloride, polyvinyl chloride, vinyl chloride copolymers, methacrylic acid ester polymers, cotton, cellophane, cellulose acetate butyrate, linen and wool.

It is a primary object of this invention to provide an adhesive composition which adheres to the surface of a highly polymerized linear ester of terephthalic acid and a glycol of the series $HO(CH_2)_nOH$, where $n$ is a whole number within the range of 2 to 10. Another object is to provide a method of preparing adhesives which adhere strongly to the highly polymerized terephthalate esters. A further object is to provide laminated structures having at least one ply of a highly polymerized linear ester of terephthalic acid and a glycol and a second ply with an intermediate layer of a copolyester defined hereinafter serving as an adhesive. A still further object is the provision of a process for adhesively uniting a highly polymerized linear terephthalate ester to itself or to other chemically dissimilar surfaces by means of a hereinafter described copolyester adhesive composition.

The objects of this invention are accomplished by trans-esterifying the lower alkyl esters of terephthalic acid, isophthalic acid and at least two acyclic dicarboxylic acids of the formula $$HOOC-CH_2-X-CH_2-COOH$$

where X is a linear chain composed of 2 to 8 atoms, with a molar excess of a polymethylene glycol of the series $HO(CH_2)_nOH$, where $n$ is an integer from 2 to 6 inclusive, to form the bis-(hydroxy alkyl) esters of the above mentioned acids, mixing the bis-(hydroxy alkyl) esters, and thereafter melt polymerizing the mixture to form a mixture polyester. In the linear chain of the acyclic dicarboxylic acids not more than two atoms may be oxygen atoms and the remaining atoms are hydrocarbon carbon atoms, any two such oxygen atoms being separated by at least two such carbon atoms, and the carbon atoms in the linear chain containing a total of not more than three carbon atoms as side chain substituents. The acyclic dicarboxylic acids differ from each other by at least three atoms in the linear chain. The more specific object are accomplished by using the above described polyester as adhesives in the form of a film, hot melt or solution for adhering polyethylene terephthalate to itself or other substances.

The molar proportions of the acid components of the copolyester are within the following ranges:

|   | Mol percent |
|---|---|
| Terephthalic acid | 20 to 60 |
| Isophthalic acid | 15 to 50 |
| Mixture of two acyclic dicarboxylic acids (the molar ratio of one to the other being in the range .5 to 2.0) | 10 to 50 |

Throughout the specification and appended claims the term "polymeric linear terephthalate ester" refers to an oriented highly polymerized linear ester of terephthalic acid and a glycol of the series $HO(CH_2)_nOH$, wherein $n$ is a whole number in the range of 2 to 10, said polymeric esters being described in U.S. Patent 2,465,319.

The following specific examples are given by the way of illustration and not limitation. The parts and percentage figures throughout the specification and the claims are expressed on a weight basis unless stated otherwise.

EXAMPLE 1

|   | Parts by wt. |
|---|---|
| Monomeric bis-(ethylene glycol) ester of terephthalic acid | 38.0 |
| Monomeric bis-(ethylene glycol) ester of isophthalic acid | 38.0 |
| 66.8 parts monomeric bis-(ethylene glycol) ester of adipic acid in 33.2 parts ethylene glycol | 13.2 |
| Monomeric bis-(ethylene glycol) ester of sebacic acid | 10.8 |
| Catalyst—antimony oxide | .05 |
|   | 100.05 |

The monomeric bis-(ethylene glycol) ester of terephthalic acid was prepared by ester interchange reaction between dimethyl terephthalate and excess ethylene glycol using calcium acetate as the catalyst. Ethylene glycol was present in the proportion of two mols per mol of dimethyl terephthalate. The mixture was heated at a reaction kettle temperature ranging from 140° to 226° C. until the methyl alcohol liberated during the reaction was completely removed by volatilization.

The monomeric bis-(ethylene glycol) ester of isophthalic acid was prepared in identical manner as the terephthalic acid ester, except dimethyl isophthalate was used in place of dimethyl terephthalate.

The monomeric bis-(ethylene glycol) ester of adipic acid was prepared by starting with adipic acid and excess ethylene glycol in the proportion of about 6.5 mols per mol of adipic acid. A nitrogen gas was blown through the reaction mixture to facilitate removal of the water liberated in the esterification reaction which was carried out over a temperature range of 165° to 208° C. The final product had a composition corresponding to about 66.8% by weight monomeric bis-(ethylene glycol) ester of adipic acid in ethylene glycol.

The monomeric bis-(ethylene glycol) ester of sebacic acid was prepared by ester interchange starting with dimethyl sebacate and ethylene glycol in the proportion of 2 mols of the glycol per mol of dimethyl sebacate. The catalyst was calcium acetate and the reaction was carried out with the temperature in the reaction kettle ranging from 150° to 225° C.

The melt polymerization was carried out by heating the reactants at atmospheric pressure for 30 minutes at a temperature in the range of 220° to 250° C. with agitation. Thereafter the pressure was reduced to about 0.5 to 1.5 mm. Hg and heating was continued increasing the temperature to about 280° C. over a period of several hours while excess glycol was removed by distillation. The polymerization was continued until the copolyester showed an inherent viscosity of 0.68 on the basis of 0.6 gram in 100 cc. of meta cresol. At this degree of polymerization, the melting point of the copolyester was about 125° C.

The molar proportions of dicarboxylic acid components or correspondingly the bis-(ethylene glycol) esters of the acids in the reaction mixture were about:

| | Mol percent |
|---|---|
| Terephthalic acid | 40 |
| Isophthalic acid | 40 |
| Adipic acid | 10 |
| Sebacic acid | 10 |
| | 100 |

The copolyester was soluble in dioxane, tetrahydrofuran, methylene chloride, chloroform, mixture of equal parts toluene and dioxane, and a mixture of 1 part dioxane and 3 parts methyl ethyl ketone. At 20% by weight of copolyester in these organic solvents, the solutions were of low viscosity, ordinarily less than 150 cps. at 25° C. Where the use of solvents is undesirable, the copolyester may be blended with plasticizers or high boiling solvent and applied by hot-melt techniques.

This copolyester adhesive was found to be particularly useful for laminating a highly polymerized terephthalate ester film to steel in the manufacture of protectively lined containers. The copolyester of this example was dissolved in five separate solvents or solvent mixtures to form 20% solutions and used as an adhesive for bonding polymerized terephthalate ester film to a steel sheet. The copolyester solutions were applied to the surface of each substrate at a dry thickness of 0.2 to 0.4 mil, i.e., a dry thickness of 0.4 to 0.8 mil for each laminate. The adhesive coated surfaces were placed face to face and the composite structure was consolidated at 150° C. under a pressure of 50 pounds per square inch applied for six seconds. The following table shows the results of this test:

*Polyethylene terephthalate film bonded to steel panels*

| Adhesive—20% Solution of Polyester In— | Thickness of Film | Adhesion—Pounds Pull Required to Separate 1" Strip of Film From Steel |
|---|---|---|
| | *Mils* | *Lbs.* |
| Dioxane | 2 | 5.0– 5.8 |
| Tetrahydrofuran | 2 | 4.5– 5.0 |
| Methylene chloride | 2 | 4.5– 5.0 |
| Chloroform | 2 | 4.5– 5.0 |
| Dioxane/methyl ethyl ketone (1:3) | [1] 5.0 | 7.5–10.0 |

[1] Thicker film used in order to prevent tearing.

The average adhesion value in the above series of tests for 160 determinations was 4.8 lbs. per 1" strip of film. The bond strength was determined with a Scott Tester measuring the force required to peel a strip of the film one inch wide from the steel. The film was peeled back through 180°.

This four acid component copolyester was resistant to cold flow, a property which is of value in post-forming of laminates. The above described laminates were post-formed on an Erichsen tester by denting the laminate with dents about ⅜ inch deep with a corresponding area increase of about 35% to test resistance to cold flow. The film did not delaminate in or after this test.

EXAMPLE 2

| | Part by wt. |
|---|---|
| Monomeric bis-(ethylene glycol) ester of terephthalic acid | 36.3 |
| Monomeric bis-(ethylene glycol) ester of isophthalic acid | 18.1 |
| 66.8 parts monomeric bis-(ethylene glycol) ester of adipic acid in 22.2 parts of ethylene glycol | 25.0 |
| Bis-(ethylene glycol) ester of sebacic acid | 20.6 |
| Catalyst—antimony oxide | .05 |
| | 100.05 |

The monomers were identical with those used in Example 1 and the melt polymerization was carried out as described in Example 1.

The molar proportions of dicarboxylic acid components or the bis-(ethylene glycol) esters of the acids in the reaction mixture correspond to:

| | Percent |
|---|---|
| Terephthalic acid | 40 |
| Isophthalic acid | 20 |
| Sebacic acid | 20 |
| Adipic acid | 20 |
| | 100 |

The polyester had an inherent viscosity of 0.58 (.6 gram polyester in 100 cc. meta cresol) and a melting point of about 88° C. Laminates of polyethylene terephthalate film 2 mils thick and sheet steel prepared as described in Example 1 using solutions of the above described copolyester as the adhesive as indicated in the table below:

*Two mil thick polyethylene terephthalate film bonded to to steel panels*

| Adhesive—20% Solution of Polyester In— | Adhesion—Pounds Pull Required to Separate 1" Strip of Film From Steel |
|---|---|
| | *Lbs.* |
| Tetrahydrofuran | 4.0–5.0 |
| Dioxane | 4.0–5.0 |
| Chloroform | 4.1–5.3 |
| Methylene chloride | 4.0–5.0 |

The average adhesion value in the above series of tests for 128 determinations was 4.7 lbs. per 1" strip of film.

The specific examples show ethylene glycol as the preferred dihydric alcohol component. Other suitable adhesives can also be prepared by substituting one or more of the following dihydric alcohols wholly or in part for the ethylene glycol on an equal molar basis: trimethylene glycol, tetramethylene glycol, pentamethylene glycol and hexamethylene glycol.

The operative concentration of terephthalic acid is in the range of about 20 to 60 mol percent based on the total dicarboxylic acid content. There is no significant contribution by the terephthalic acid when present at a proportion less than 20 mol percent and when the proportion is more than 60 mol percent, the copolyester is poorly soluble or even insoluble in organic liquids, difficult to adhere to most substrates and shows a greater tendency toward crystallinity, the mol percentages being based on the total acid content.

The proportion of isophthalic acid is in the range of 15 to 50 mol percent, based on total acid content. A proportion of at least about 15 mol percent of isophthalic acid is ordinarily necessary to significantly retard crystallization on aging and to improve the solubility.

The total proportion of the two acyclic acid components can be varied from 10 to 50 mol percent of the total acid components. A proportion greater than 50 mol percent results in copolyesters which are soft and weak. Ordinarily at least about 10 mol percent of the two acyclic acids is required to provide a polyester soluble in commonly available organic solvents.

The lower molecular weight acyclic dicarboxylic acid component provides the copolyester with a sharper melting point range, which is desirable for adhesive uses, but adversely affects the amorphous character, i.e., increases the crystallinity. The higher molecular weight acyclic dicarboxylic acid offsets the crystallinity without substantially changing the melting point range of the copolyester.

It is preferred to use the acyclic dicarboxylic acids in substantially equal molar proportions although useful products can be produced when the molar ratio of one acyclic acid to the other is within the range of .5 to 2.0.

Suitable adhesives can also be prepared by substituting other acyclic dicarboxylic acids for the sebacic and/or adipic acid wholly or in part on a molar basis. Other combinations of acyclic dicarboxylic acids which can be used include combinations of any two of the following: adipic, pimelic, suberic, azelaic, sebacic, oxydibutyric, 5-oxa-1,10-decanedioic, undecanedioic, 4-n-propyl suberic, B-methyl-B'-ethyl suberic, 6,6-dimethyl undecane-1,11-dioic, oxydivaleric, 7-oxa-1,11-undecanedioic and dodecanedioic; as long as the two acids differ from each other by at least 3 atoms in the linear chain. When the difference in chain length is only two atoms, the mixture ordinarily will be composed of consecutive members of either even or odd numbered carbon atom acids which do not differ significantly from one another. A difference of at least 3 atoms in the chain length provides for mixtures of even and odd carbon atom acids and acids differing by at least two carbon atoms plus an oxygen atom in the linear chain length.

The specific method described for the preparation of the copolyesters involved starting with preformed bis-(hydroxyethyl) esters of the respective dicarboxylic acids. It is not necessary that the preparation of the copolyesters be carried out in two independent stages; that is, a separate initial esterification stage and a subsequent separate polymerization stage. The preparation can be carried out as a unit operation of consecutive stages in one reaction kettle.

In the preparation of monomeric bis-(hydroxyethyl) terephthalate and similar monomeric bis-esters of other dihydric alcohols, it is most convenient to initiate the esterification with dimethyl terephthalate rather than carry out direct esterification of terephthalic acid. Other dialkyl terephthalates, in which the alkyl substituent is the alkyl group of a 2 to 6 carbon atom saturated aliphatic monohydric alcohol, can be used in place of dimethyl terephthalate as the initiating ester. Such alcohols ordinarily are easily volatilized for removal during the trans-esterification stage.

Isophthalic acid and the two acyclic dicarboxylic acids can be introduced into the reaction mixture for direct esterification with the dihydric alcohol but ordinarily it is desirable to introduce these components as a dimethyl ester or a bis-alkyl ester of one of the aforementioned monohydric alcohols and carry out the ester-interchange reaction to form a bis-(hydroxyalkyl) ester of the acid with one of the above-mentioned dihydric alcohols.

Polymerization of the mixture of bis-(hydroxyalkyl) dicarboxylates can be carried out over a wide temperature for a period of time sufficient for the copolyester to develop an inherent viscosity in the range of about 0.25 to 1.5. Ordinarily for adhesive use copolyesters having an inherent viscosity in the range of 0.4 to 1.0 are preferred. The temperature is desirably in the range of 200° C. to 300° C. during the copolymerization. A reduced pressure in combination with this temperature range is used to facilitate removal of dihydric alcohol liberated during the polymerization reaction.

The copolyesters of my invention are suitable for laminating polymeric terephthalate ester film to plywood, aluminum, copper, vinyl chloride polymer film cellulose acetate butyrate film regenerated cellulose film, paper, fiber board and oriented highly polymeric terephthalate ester fiber woven as fabric. The copolyesters of my invention are also useful as binder for a mat of non-woven fibers such as, e.g., polyacrylonitrile, polyethylene terephthalate, cotton, wool, and glass. Another important use of these copolyesters is as a hot-melt adhesive for fabricating metal containers wherein the copolyester replaces solder in the side seam. Such containers are acceptable for packaging motor oil and other liquid or dry products which ordinarily are not pasteurized or heat-processed in the container.

Copolyester adhesives of this invention are applicable as hot-melt compositions preformed films and as solutions in volatile organic solvents. Suitable organic solvents in which the copolyesters are ordinarily soluble to the extent of at least 5% include butyrolactone, benzyl alcohol, dimethyl sulfoxide, dioxane, dimethyl formamide, diacetone alcohol, chloroform, cyclohexanone, methyl ethyl ketone, methylene chloride, nitromethane, tetrahydrofuran, toluene and "Carbitol" acetate. Methyl ethyl ketone is a relatively poor solvent alone for the copolyesters derived from acid mixtures containing a high molar proportion of terephthalic and isophthalic acids, but such copolyesters are readily soluble in mixtures of methyl ethyl ketone with either dioxane or toluene. The copolyester of Example 1 was difficultly soluble in methyl ethyl ketone at 5% concentration, but a solution of this copolyester in a mixture of 70 parts methyl ethyl ketone and 30 parts toluene was 100 centipoise viscosity at 20% concentration. Another particularly suitable solvent mixture is 25 parts dioxane and 75 parts methyl ethyl ketone. With these various solvents and solvent mixtures, it was found possible to prepare fluid solutions of these copolyesters at concentrations as high as 50% by weight.

For most purposes, the copolyesters of this invention are used as adhesives without external modification by admixture with other materials, modification ordinarily being adequately accomplished internally by variation in the proportions of the reactants. Plasticizers, such as chlorinated diphenyl, tricresyl phosphate and other aryl and alkyl phosphates, can be admixed with the copolyester. It will be recognized that ester plasticizers introduced with the ester-forming reactants during either the esterification or the polymerization stage can also undergo ester interchange and contribute to the copolyester structure. For example, the presence of dibutyl phthalate, would introduce orthophthalic acid groups in the copolyester.

The copolyesters can be compounded in combination with other compatible synthetic organic resins and polymers, but ordinarily such compounding is limited because of solvency differences. The copolyesters can be extended with conventional inorganic extenders or fillers and can be colored with pigments if desired.

While the primary utility of the invention copolyesters is as an adhesive, the copolyesters can also be used as a coating composition. These copolyesters as an adhesive provide laminates which have improved properties, particularly in reference to post-forming of the laminate and retention of a strong bond on aging. Metal laminates in which the copolyester and adhesive functions as a solder replacement and laminates of highly polymerized terephthalate ester film adhered to sheet metal are useful in the fabrication of containers.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by the prior art.

The embodiments of the invention in which an exclusive property or privilege is claimed are defined as follows:

1. A linear copolyester which is the reaction product of a glycol of the series $HO(CH_2)_nOH$, where $n$ is an integer from 2 to 6 inclusive, terephthalic acid, isophthalic acid, and at least two acyclic dicarboxylic acids of the formula $HOOC-CH_2-X-CH_2-COOH$, where X is a linear chain of 2 to 8 atoms in the chain of which not more than two atoms may be oxygen atoms and the remaining atoms are hydrocarbon carbon atoms, said acyclic acids differing from each other by at least three atoms in the linear chain, the molar proportions of the acid components of said copolyester being within the following ranges:

| | Mol percent |
|---|---|
| Terephthalic acid | 20 to 60 |
| Isophthalic acid | 15 to 50 |
| Mixture of two acyclic dicarboxylic acids | 10 to 50 | the molar ratio of one acyclic acid to the other being in the range of .5 to 2.0.

2. The product of claim 1 in which the acyclic dicarboxylic acids are sebacic and adipic acids.

3. The product of claim 1 in which the mol percentages of the acid components of the copolyester are about:

| | Mol percent |
|---|---|
| Terephthalic acid | 40 |
| Isophthalic acid | 40 |
| Adipic acid | 10 |
| Sebacic acid | 10 |

4. The product of claim 1 in which the mol percentages of the acid components are about:

| | Mol percent |
|---|---|
| Terephthalic acid | 40 |
| Isophthalic acid | 20 |
| Sebacic acid | 20 |
| Adipic acid | 20 |

5. A polymeric linear terephthalate ester surface with an adherent layer of the copolyester of claim 1.

6. A laminated assembly comprising a lamina of a polymeric linear terephthalate ester and another lamina adhered thereto by means of interposed layer of the copolyester of claim 1.

7. The product of claim 6 in which the other lamina is metal.

8. The product of claim 6 in which the other lamina is a polymeric linear terephthalate ester.

9. The product of claim 6 in which the other layer is polyacrylonitrile.

10. The product of claim 6 in which the other lamina is wood.

11. The process which comprises reacting under melt polymerization conditions bis-(hydroxy alkyl) esters of terephthalic acid, isophthalic acid and at least two acyclic dicarboxylic acids of the formula $$HOOC-CH_2-X-CH_2-COOH$$

where X is a linear chain of 2 to 8 atoms, in the chain of which not more than two atoms may be oxygen atoms and the remaining atoms are hydrocarbon carbon atoms, said acyclic dicarboxylic acids differing from each other by at least three atoms in the linear chain, the molar proportions of the acid components being within the following ranges:

| | Mol percent |
|---|---|
| Terephthalic acid | 20 to 60 |
| Isophthalic acid | 15 to 50 |
| Mixtures of two acyclic dicarboxylic acids | 10 to 50 | the molar ratio of one acyclic dicarboxylic acid to the other being in the range .5 to 2.0.

12. An adhesive composition comprising the linear copolyester of claim 1 dissolved in a solvent for the copolyester.

References Cited in the file of this patent

UNITED STATES PATENTS

| 2,673,826 | Ness | Mar. 30, 1954 |
| 2,676,128 | Piccard | Apr. 20, 1954 |
| 2,765,250 | Williams | Oct. 2, 1956 |
| 2,765,251 | Williams | Oct. 2, 1956 |